United States Patent
Kawanishi et al.

[11] Patent Number: 6,077,431
[45] Date of Patent: Jun. 20, 2000

[54] PROCESS FOR DECOMPOSITION AND REMOVAL OF DIOXINS CONTAINED IN SLUDGE

[75] Inventors: Toshio Kawanishi; Yasuo Horii; Koichi Nakagawa, all of Osaka, Japan

[73] Assignee: Kubota Corporation, Osaka, Japan

[21] Appl. No.: 09/294,638

[22] Filed: Apr. 19, 1999

[30] Foreign Application Priority Data

Apr. 20, 1998 [JP] Japan .................................. 10-108371
Apr. 20, 1998 [JP] Japan .................................. 10-108374

[51] Int. Cl.[7] ................................ C02F 1/36; C02F 11/14
[52] U.S. Cl. .......................... 210/609; 210/361; 210/748; 210/909; 588/207; 588/212
[58] Field of Search .................................. 210/609, 631, 210/748, 760, 908, 909; 588/204, 206, 207, 212

[56] References Cited

U.S. PATENT DOCUMENTS

| | | | |
|---|---|---|---|
| 4,341,078 | 7/1982 | Weitzen | 588/207 |
| 4,477,357 | 10/1984 | Sittenfield | 210/748 |
| 5,102,510 | 4/1992 | Darion | 205/461 |
| 5,130,031 | 7/1992 | Johnston | 210/748 |
| 5,130,032 | 7/1992 | Sartori | 210/748 |

*Primary Examiner*—Thomas G. Wyse
*Attorney, Agent, or Firm*—Fildes & Outland, P.C.

[57] ABSTRACT

A process is disclosed which comprises the steps of: slurrying sludge to be treated; applying ultrasonic radiation to the slurry to decompose dioxins contained in the sludge in a reaction field developed by the application of the ultrasonic radiation and to transfer pollutants including the resulting decomposition products from a solid phase to a liquid phase of the slurry; and separating the slurry into the liquid phase containing the pollutants and the solid phase free from dioxins by solid-liquid separation means.

3 Claims, 5 Drawing Sheets

PROCESS FOR DECOMPOSITION AND REMOVAL OF DIOXINS CONTAINED IN SLUDGE

FIELD OF THE INVENTION

The present invention relates to a process for removing dioxins from sludge in leachate treatment facilities in general waste final disposal sites and in industrial waste water treatment facilities.

BACKGROUND OF THE INVENTION

The following processes are generally employed for treatment of waste water containing dioxins, for example, for treatment of leachate from a general waste final disposal site and for treatment of industrial waste water such as pulp mill waste water.

The process for the treatment of leachate from a landfill includes the steps of: removing dirt, sand and the like in a pretreatment plant; removing heavy metals such as calcium and manganese by coagulation and sedimentation thereof in a calcium removal plant; removing BOD substances (BOD) and nitrogen-containing substances (T-N) by biodegradation thereof in a biological treatment plant; removing COD substances (COD), floating matters, phosphorus-containing substances (T-P) and the like by coagulation and sedimentation thereof in a coagulation/sedimentation plant; removing fine floating matters in a sand filtration tower; removing dioxins remaining in the leachate in an activated carbon adsorption column after treatment in an ozone/ultraviolet reactor; and releasing the resulting leachate.

Sludge produced in the calcium removal plant, the biological treatment plant, the coagulation/sedimentation plant and the like is thickened in a sludge thickener, and then stored in a sludge storage tank. Thereafter, a dewatering promoter is added to the sludge, which is in turn dewatered by means of a sludge dewatering machine. The dewatered sludge cake is again disposed of in a landfill of the final disposal site.

However, a major proportion of dioxins are incorporated in the sludge produced in the calcium removal plant, the biological treatment plant, the coagulation/sedimentation plant and the like. Therefore, if the dewatered sludge cake is disposed of in the landfill, dioxins are accumulated in the landfill of the final disposal site, and again leached out into leachate. As a result, the decomposition and removal of dioxins requires a longer period of time.

In order to solve the aforesaid problem, it is an object of the present invention to provide a process for decomposition and removal of dioxins contained in sludge.

SUMMARY OF THE INVENTION

To achieve the aforesaid object, the process according to the present invention comprises the steps of: slurrying sludge to be treated; applying ultrasonic radiation to the slurry to decompose dioxins contained in the sludge in a reaction field developed by the application of the ultrasonic radiation and to transfer pollutants including the resulting decomposition products from a solid phase to a liquid phase of the slurry; and separating the slurry into the liquid phase containing the pollutants and the solid phase free from dioxins by solid-liquid separation means.

Examples of the sludge to be treated by the aforesaid process include raw sludge, thick sludge, dewatered sludge and mixtures thereof. The sludge is imparted with a proper fluidity by the slurrying thereof.

The application of the ultrasonic radiation causes evolution, dispersion, expansion and crush of cavitation bubbles in the slurry, thereby developing a reaction field at a temperature of several thousands degrees centigrade and a pressure of several hundreds atmospheric pressure. The reaction field causes the decomposition of dioxins contained in the sludge.

In the reaction field, hydrogen radicals, oxygen radicals, hydroxyl radicals, nitrogen radicals and the like are generated from water surrounding the cavities and oxygen and nitrogen dissolved therein, whereby oxidizing compounds such as hydrogen peroxide, nitrous acid and nitric acid are generated. These radicals and oxidizing compounds decompose dioxins and pollutants contained in the sludge. Other exemplary pollutants include COD substances (COD), BOD substances (BOD) and nitrogen-containing substances (T-N).

On the other hand, dioxins and other pollutants (COD, BOD, T-N and the like) incorporated in the surface and inner portions of the sludge are transferred from the solid phase to the liquid phase by vibrational energy of the ultrasonic radiation.

As a result, dioxins and other pollutants are more efficiently subjected to the reaction field thereby to be more frequently brought into contact with the radicals and oxidizing compounds. Thus, the decomposition of dioxins and pollutants is promoted.

The solid-liquid separation of the treated slurry provides for sludge which is free from dioxins. In addition to dioxins, the other pollutants can be removed from the original sludge.

For efficient application of the ultrasonic radiation, the effective sludge concentration in the slurry is within a range between 0.1% and 10% on a total solids (TS) basis. If the sludge is slurried in a concentration of 0.1% or lower, the total amount of the resulting slurry is too large, so that a greater amount of energy is required for the treatment. If the sludge is slurried in a concentration of 10% or higher, the resulting slurry has a higher viscosity and hence a poor fluidity, so that the reaction efficiency is reduced.

The effective frequency of the ultrasonic radiation is about 20 kHz to about 500 kHz, more preferably 40 kHz to 200 kHz, depending on the types of the pollutants and the treatment conditions. The effective temperature of the slurry is about 10° C. to about 50° C. This temperature range enhances the reactivity of the reaction field, the radicals and the oxidizing compounds.

For more effective treatment, an oxygen-containing gas is blown into the slurry when the slurry is subjected to the ultrasonic radiation. Thus, an oxygen-rich reaction field is developed, so that the development of the cavities and the generation of the radicals and the oxidizing compounds can be enhanced to promote the decomposition of dioxins.

DETAILED DESCRIPTION OF THE EMBODIMENTS

Figure 1:
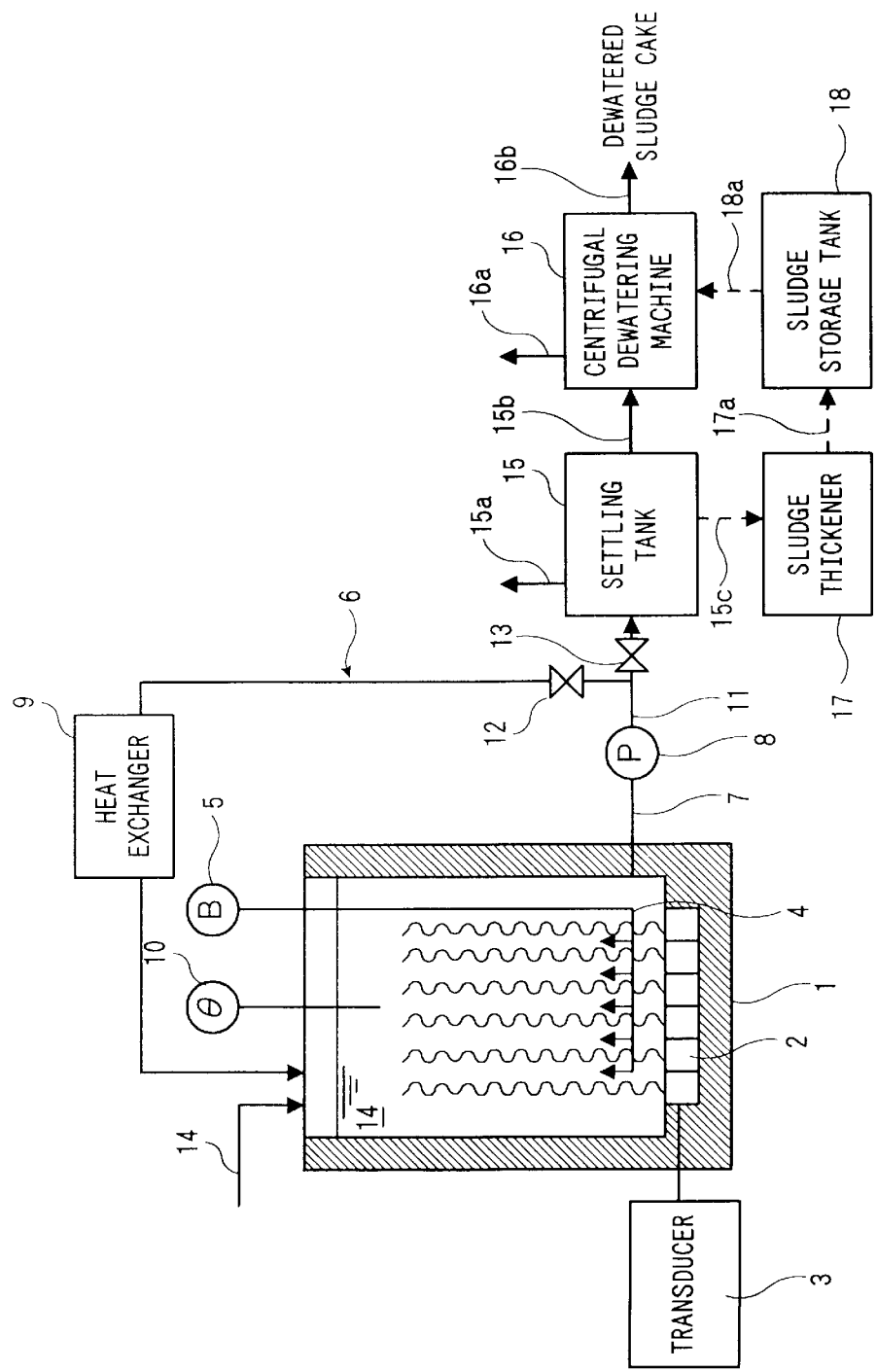
FIG. 1 is a block diagram illustrating the construction of an apparatus for removing dioxins through decomposition thereof in accordance with one embodiment of the present invention.

One embodiment of the present invention will hereinafter be described with reference to the drawings. Referring to FIG. 1, a reaction vessel 1 includes ultrasonic oscillation elements 2 disposed on the bottom thereof, and an transducer 3 connected to the oscillation elements 2 is provided outside the reaction vessel 1. An aerator 4 is provided in the reaction vessel 1, and a blower 5 connected to the aerator 4 is provided outside the reaction vessel 1.

A circulation system 6 comprises a pipe line 7 having a proximal end connected to a bottom portion of the reaction vessel 1 and a distal end opening to the inside of the reaction vessel 1, and a circulation pump 8 and a heat exchanger 9 disposed on the pipe line 7. The heat exchanger 9 is supplied with a coolant (not shown) for cooling slurry flowing from the vessel through the pipe line 7. The circulation pump 8 is actuated and stopped on the basis of the temperature of the slurry in the reaction vessel 1 measured by means of a thermometer 10, thereby regulating the temperature of the slurry in the reaction vessel at a predetermined level. A discharge pipe 11 is branched from the pipe line 7 downstream of the circulation pump 8, and a first valve 12 and a second valve 13 are provided on the pipe line 7 and the discharge pipe 11, respectively, downstream of the branch point.

The slurry 14 to be charged into the reaction vessel 1 is prepared by slurrying raw sludge, thick sludge, dewatered sludge or a mixture thereof containing dioxins in a predetermined sludge concentration, and has a proper fluidity.

A predetermined amount of the slurry 14 is retained in the reaction vessel 1. The slurry 14 is aerated with air supplied through the aerator 4 from the blower 5 thereby to be agitated to flow inside the reaction vessel 1. With this state, an oscillation voltage is applied to the oscillation elements 2 from the transducer 3 to oscillate the oscillation elements 2 for generation of ultrasonic radiation, which is applied to the slurry 14.

The application of the ultrasonic radiation evolves cavitation bubbles in the slurry 14, and causes development, dispersion, expansion and crush of cavities. At this time, a reaction field at a temperature of several thousands degrees centigrade and a pressure of several hundreds atmospheric pressure is formed in the slurry 14.

This reaction field causes decomposition of dioxins contained in the sludge in the slurry 14.

In the reaction field, hydrogen radicals, oxygen radicals, hydroxyl radicals, nitrogen radicals and the like are generated from water surrounding the cavities and oxygen and nitrogen dissolved therein, whereby oxidizing compounds such as hydrogen peroxide, nitrous acid and nitric acid are generated.

These radicals and oxidizing compounds decompose dioxins and other pollutants (COD, BOD, T-N and the like) contained in the sludge 14.

The slurry 14 which is supplied with oxygen through the aeration is in an oxygen-rich state, so that the development of the cavities and the generation of the radicals and oxidizing compounds are enhanced to promote the decomposition of dioxins.

On the other hand, dioxins and other pollutants (COD, BOD, T-N and the like) incorporated in the surface and inner portions of the sludge are transferred from a solid phase to a liquid phase of the slurry 14 by vibrational energy of the ultrasonic radiation.

As a result, dioxins and pollutants are more efficiently subjected to the reaction field thereby to be more frequently brought into contact with the radicals and oxidizing compounds. Thus, the decomposition of dioxins and pollutants is promoted.

With the progress of the reaction process, the temperature of the slurry 14 rises. Therefore, the inside temperature of the reaction vessel is measured by means of the thermometer 10. The circulation pump 8 is actuated and stopped on the basis of the measurement of the temperature, and the slurry 14 flowing through the pipe line 7 is cooled by means of the heat exchanger 9 for regulating the temperature of the slurry 14 in the vessel at the predetermined level. At this time, the first valve 12 is open, and the second valve 13 is closed.

After a lapse of a predetermined time period, the application of the ultrasonic radiation is discontinued. Then, the first valve 12 is closed and the second valve 13 is opened to feed the slurry 14 to a settling tank 15 through the discharge pipe 11 from the vessel by actuating the circulation pump 8. The slurry 14 is subjected to sedimentation in the settling tank 15. The resulting supernatant liquor is taken out as separation liquid 15a, and the resulting sediment sludge is taken out as treated sludge 15b. Then, the sediment sludge is dewatered by means of a centrifugal dewatering machine. The removed liquid is taken out as separation liquid 16a, and the dewatered cake 16b is discharged.

If the concentration of the sediment sludge is low (i.e., not higher than 1% on a total solids (TS) basis) when the sediment sludge is to be transferred from the settling tank 15 to the centrifugal dewatering machine 16, the sediment sludge in the settling tank 15 is supplied as drawn sludge 15c into a sludge thickener 17, and the resulting thick sludge 17a is temporarily stored in a sludge storage tank 18 and then supplied as feed sludge 18a to the dewatering machine 16, as indicated by broken lines in FIG. 1. Thus, the dewatering can stably be performed with an improved dewatering efficiency.

By thus separating the treated slurry 14 into the liquid phase containing the pollutants and the solid phase free from dioxins, sludge not containing dioxins can be obtained. In addition to dioxins, the other pollutants can be removed from the original sludge.

The effects of the application of the ultrasonic radiation will next be described by way of examples.

EXAMPLE 1

Raw sludge was slurried in a sludge concentration of 8% on a total solids (TS) basis, and the resulting slurry 14 was introduced into the reaction vessel 1 (10-L volume). The temperature of the slurry in the vessel was regulated at 35° C., and subjected to ultrasonic radiation of 40 kHz (300 W) for five hours. Then, the treated slurry 14 was settled in the settling tank 15 for 30 minutes. Thus, treated sludge (sediment sludge) and separation liquid (supernatant liquor) were obtained. The results of content analysis of the raw sludge, the treated sludge and the separation liquid are shown in the following Table 1.

In Table 1, the treated sludge and the separation liquid contained almost no dioxins, and possessed no toxicity with a toxicity evaluation quantity (TEQ) of zero. While the ignition loss of the raw sludge was 39.4%, the ignition loss of the treated sludge was 5.4%. The separation liquid contained a relatively large amount of pollutants such as BOD, COD and T-N. This indicates that the BOD, COD, T-N and other pollutants contained in the raw sludge were transferred to the separation liquid.

Figure 2:
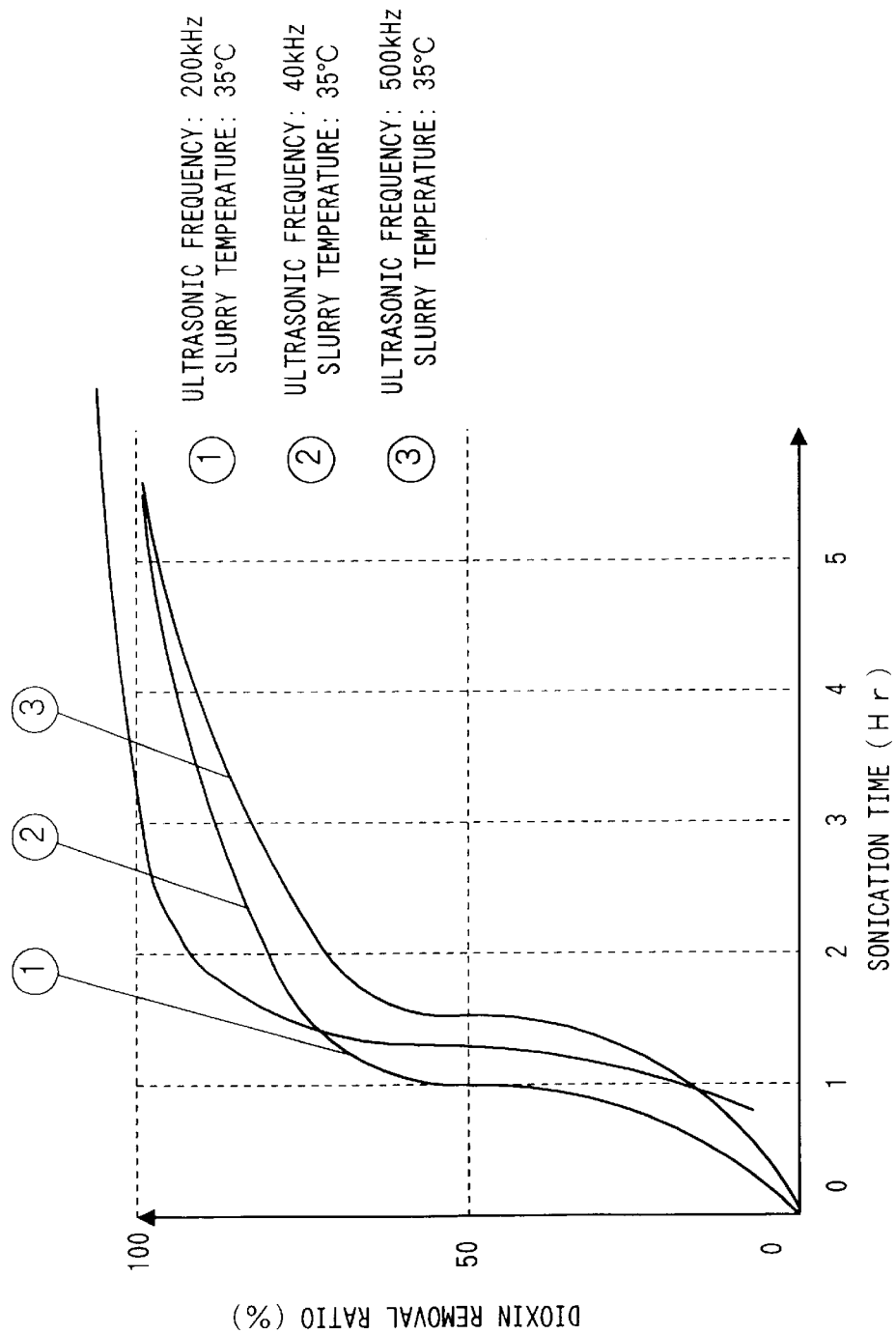
FIG. 2 is a graph showing a relationship between the dioxin removal ratio and the sonication time in accordance with the embodiment.

As shown in FIG. 2, there is a certain relationship between the dioxin removal ratio (%) and the sonication time (h), and the dioxin removal ratio generally reaches the highest level in about five hours of the application of the ultrasonic radiation.

TABLE 1

| Item | Unit | Raw sludge Measured | Raw sludge TEQ | Treated sludge Measured | Treated sludge TEQ | Unit | Separation liquid Measured | Separation liquid TEQ |
|---|---|---|---|---|---|---|---|---|
| $T_4CDDs$ | pg/g | ND | 0 | ND | 0 | pg/L | ND | 0 |
| $P_5CDDs$ | pg/g | ND | 0 | ND | 0 | pg/L | ND | 0 |
| $H_6CDDs$ | pg/g | 14 | 2.5 | ND | 0 | pg/L | 1.9 | 0 |
| $H_7CDDs$ | pg/g | 7.8 | 0.044 | ND | 0 | pg/L | 0.048 | 0.00048 |
| $O_8CDDs$ | pg/g | 13 | 0.013 | ND | 0 | pg/L | 2.1 | 0.0021 |
| PCDDs | pg/g | 35 | 2.6 | 0 | 0 | pg/L | 4.0 | 0.0026 |
| $T_4CDFs$ | pg/g | ND | 0 | ND | 0 | pg/L | ND | 0 |
| $P_5CDDs$ | pg/g | 31 | 0 | ND | 0 | pg/L | ND | 0 |
| $H_6CDDs$ | pg/g | 32 | 0 | 6.2 | 0 | pg/L | ND | 0 |
| $H_7CDFs$ | pg/g | 14 | 0.064 | 0.12 | 0 | pg/L | 0.0480 | 0.00026 |
| $O_8CDFs$ | pg/g | 5.1 | 0.005 | ND | 0 | pg/L | 0.24 | 0.00024 |
| PCDFs | pg/g | 82 | 0.069 | 6.3 | 0 | pg/L | 0.29 | 0.00050 |
| PCDDs + PCDFs | pg/g | 117 | 2.6 | 6.3 | 0 | pg/L | 4.3 | 0.0031 |
| pH | | 9.7 | | — | | | 9.2 | |
| M alkalinity | mg/L | — | | — | | | 39 | |
| SS | mg/L | — | | 569530 | | | 33 | |
| VSS | mg/L | — | | 53910 | | | — | |
| BOD | mg/L | — | | — | | | 1124 | |
| $COD_{Mn}$ | mg/L | — | | — | | | 567 | |
| TOC | mg/L | — | | — | | | 376 | |
| T-N | mg/L | — | | — | | | 23.5 | |
| $NH_4$—N | mg/L | — | | — | | | 16.6 | |
| $NO_2$—N | mg/L | — | | — | | | 2.6 | |
| $NO_3$—N | mg/L | — | | — | | | 3.1 | |
| T—P | mg/L | — | | — | | | 0.02 | |
| $Cl^-$ | mg/L | — | | — | | | 595 | |
| T—Ca | mg/L | — | | — | | | 204 | |
| TDS | mg/L | — | | — | | | 2220 | |
| TS | % | 44.4 | | 58.4 | | | — | |
| VS | % | 39.4 | | 5.4 | | | — | |
| Residue on ignition | % | 5.0 | | 53.0 | | | — | |

EXAMPLE 2

Raw sludge was slurried in a sludge concentration of 1.1% on a total solids (TS) basis, and the resulting slurry 14 was introduced into the reaction vessel 1. The temperature of the slurry in the vessel was regulated at 35° C., and subjected to ultrasonic radiation of 40 kHz (300 W) for five hours. Then, the treated slurry 14 was settled in the settling tank 15 for 30 minutes. Thus, treated sludge (sediment sludge) and separation liquid (supernatant liquor) were obtained. The results of content analysis of the raw sludge, the treated sludge and the separation liquid are shown in the following Table 2.

TABLE 2

| | Unit | Raw sludge Measured | Raw sludge TEQ | Separation liquid Measured | Separation liquid TEQ | Unit | Treated sludge Measured | Treated sludge TEQ |
|---|---|---|---|---|---|---|---|---|
| Dioxins | pg/L | 6600 | 63 | 35 | ND | pg/g | 370 | ND |
| (PCDDs & PCDFs) | | | | | | | | |

As apparent from Table 2, the treated sludge and the separation liquid each contained a remarkably reduced amount of dioxins with no toxicity detected. This indicates that the dioxins were efficiently decomposed by the application of the ultrasonic radiation.

EXAMPLE 3

Dewatered sludge cake having a composition as shown in Table 3 was slurried in a sludge concentration of 7.4% on a total solids (TS) basis, and the resulting slurry was introduced into the reaction vessel 1. The temperature of the slurry in the vessel was regulated at 35° C., and subjected to ultrasonic radiation of 40 kHz (300 W) for five hours. Then, the treated slurry 14 was settled in the settling tank 15 for 30 minutes. Thus, treated sludge (sediment sludge) and separation liquid (supernatant liquor) were obtained. The results of content analysis of the raw sludge and the treated sludge are shown in Table 4.

TABLE 3

| Item | Unit | Value |
| --- | --- | --- |
| pH | — | 7.9 |
| Specific gravity | — | 1.2 |
| Water content | % | 80.5 |
| TS | % | 19.5 |
| Ignition loss | % | 21.3 |
| C content | % | 7.5 |
| H content | % | 1.6 |
| N content | % | 0.96 |
| O content | % | 13.16 |
| Ash content | % | 76.7 |
| Fe content | % | 39.6 |
| Ca content | % | 0.51 |

TABLE 4

| | | Dewatered cake | | Treated sludge | |
| --- | --- | --- | --- | --- | --- |
| Item | Unit | Measured | TEQ | Measured | TEQ |
| Dioxins (PCDDs & PCDFs) | pg/g | 13.000 | 140 | 0 | 0 |

As apparent from Table 4, the sludge obtained after the application of the ultrasonic radiation contained no dioxins with no toxicity detected. This indicates that the dioxins were almost completely decomposed by the application of the ultrasonic radiation.

As described above, dioxins can be decomposed through the ultrasonic treatment and reduced. In addition, other organic and inorganic pollutants can be transferred to the liquid phase, and separated from the sludge.

For efficient application of the ultrasonic radiation, the sludge concentration in the slurry is not limited to those described in Examples 1 to 3, but the effective range of the sludge concentration is from 0.1% to 10% on a total solids (TS) basis. The frequency of the ultrasonic radiation is not limited to those described in Examples 1 to 3, but the effective rage of the ultrasonic frequency is from about 20 kHz to about 500 kHz, more preferably from 40 kHz to 200 kHz. Further, the temperature of the slurry is not limited to those described in Examples 1 to 3, but the effective range of the slurry temperature is from about 10° C. to about 50° C.

Figure 3:
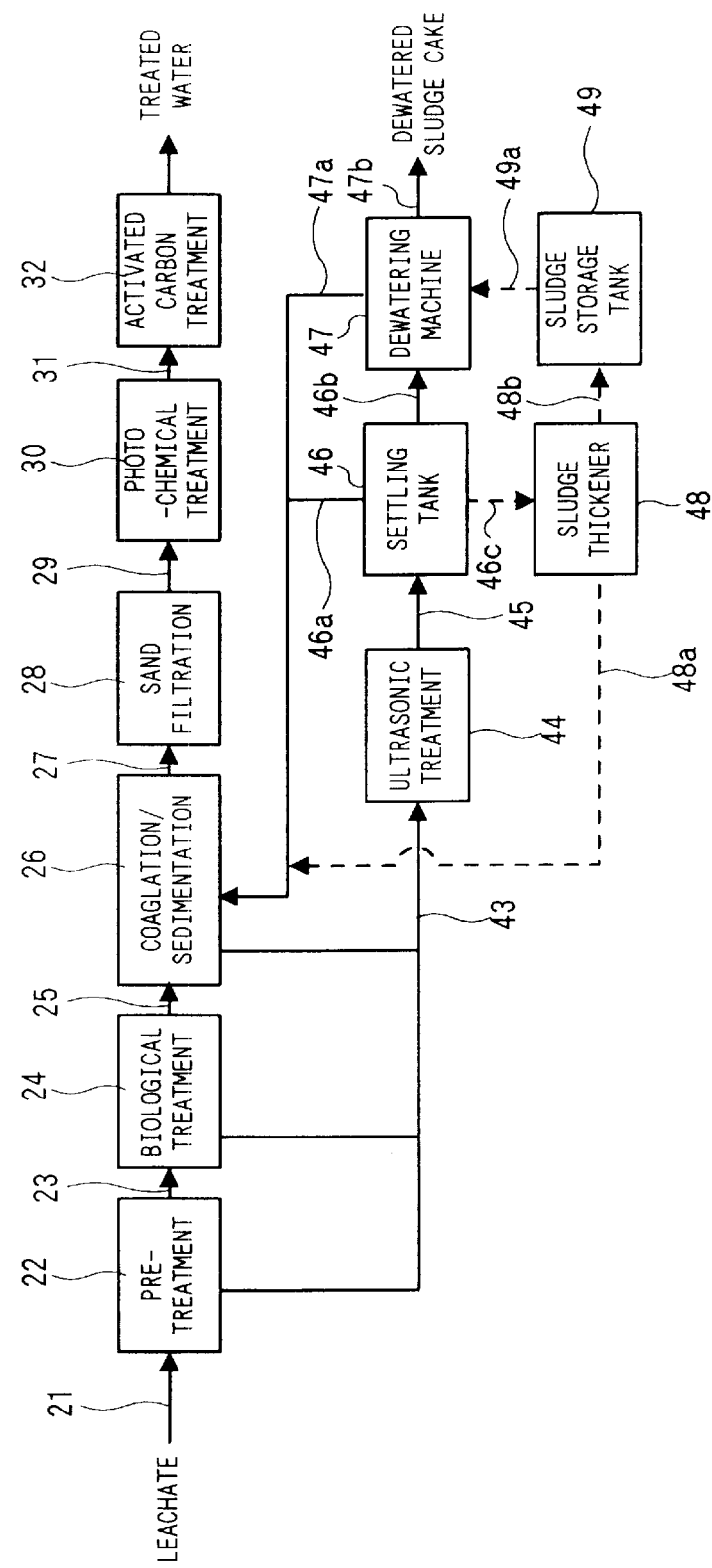
FIG. 3 is a flow sheet showing a process for removing dioxins through decomposition thereof in accordance with another embodiment of the present invention.
Figure 4:
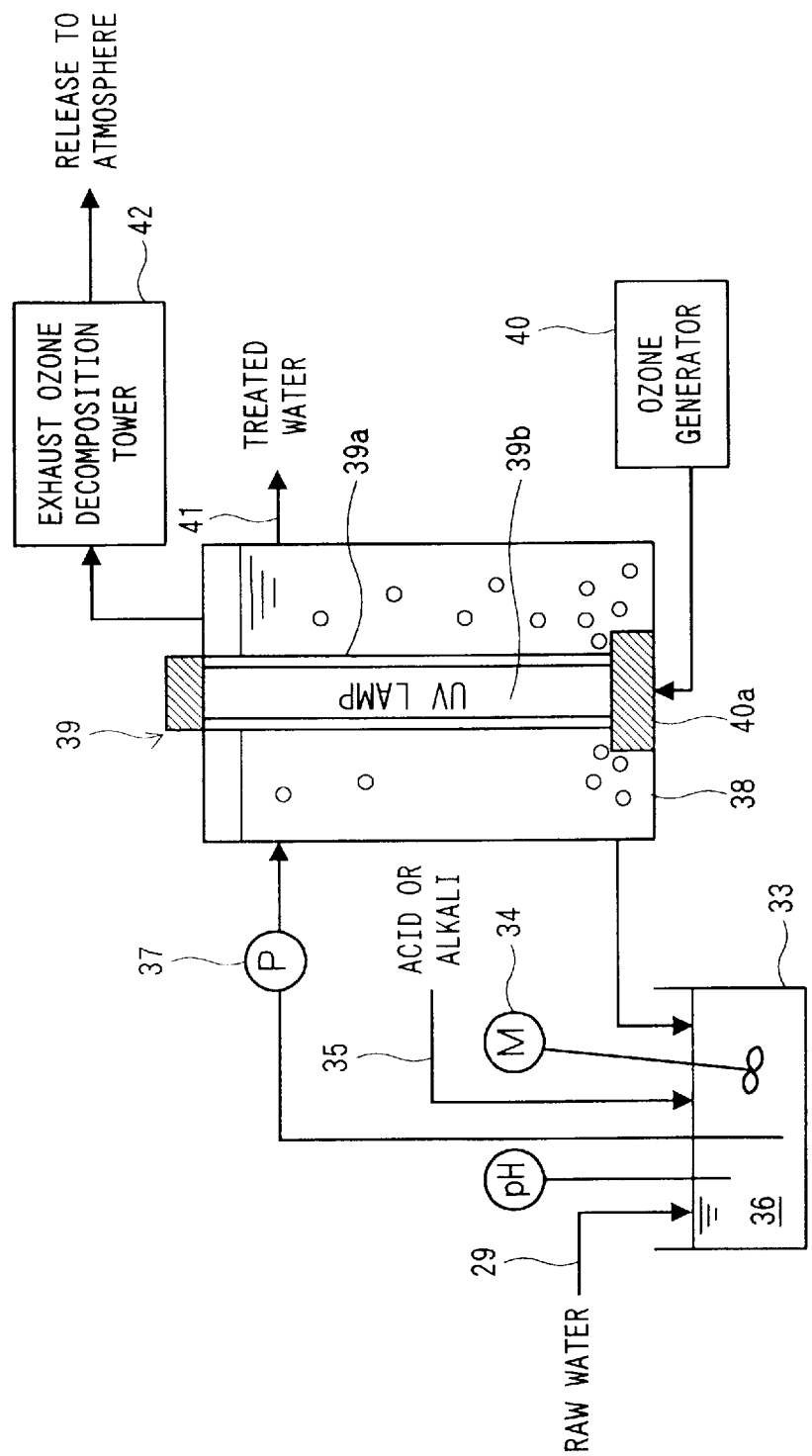
FIG. 4 is a block diagram illustrating an apparatus for performing a photo-chemical treatment process employing ultraviolet radiation and ozone in combination in accordance with the embodiment.

Another embodiment of the present invention will be described with reference to the drawings. Referring to FIGS. 3 and 4, leachate 21 from a landfill of a general waste final disposal site is subjected to a pretreatment process 22 for coagulation and sedimentation of calcium contained in the leachate. Then, the water 23 pretreated through the coagulation and sedimentation is subjected to a biological treatment process 24, in which biodegradable substances contained in the pretreated water 23 are biodegraded for removal thereof. The biologically treated water 25 is next subjected to a coagulation/sedimentation process 26 for coagulation and sedimentation of pollutants contained in the biologically treated water 25. The water 27 treated through the coagulation and sedimentation is further subjected to a sand filtration process 28 for filtration of floating matters contained in the treated water 27. The resulting raw water 29 is subjected to a photo-chemical treatment process 30 which employs ultraviolet radiation and ozone in combination. In this process, non-biodegradable substances contained in the raw water 29 are irradiated with ultraviolet radiation in the presence of ozone for decomposition thereof. This process will be described later in detail. The photolytically treated water 31 is subjected to an activated carbon treatment process 32, in which residual pollutants contained in the photolytically treated water 31 are adsorbed.

In the photo-chemical treatment process 30, as shown in FIG. 4, the raw water 29 is introduced into a pH regulation tank 33, in which the pH of the water 36 to be treated is regulated at 5.8 to 8.6 by adding thereto an acid or an alkali 35. The water 36 is fed into a treatment vessel 38 by means of a pump 37.

In the treatment vessel 38, the water 36 supplied from the top thereof is irradiated with ultraviolet radiation of a wavelength of 185 nm or 254 nm by means of an ultraviolet lamp unit 39 disposed therein. The ultraviolet lamp unit 39 comprises a transparent protective pipe 39a and an ultraviolet lamp 39b provided in the protective pipe 39a. With this state, ozone is supplied in an ozone concentration of not lower than 10 $g/m^3$ into the treatment vessel 38 from an ozone generator 40 through an aerator 40 disposed on the bottom of the vessel.

At the same time, the water 36 to be treated is fed back to the pH regulator 33 from a bottom portion of the vessel, and part of the water 36 is allowed to flow out of the treatment vessel 38 as treated water 41. While thus being circulated between the pH regulation tank 33 and the treatment vessel 38, the water 36 is retained in the treatment vessel 38 for about five hours.

While flowing down to the bottom of the treatment vessel 38, the water 36 to be treated is irradiated with ultraviolet radiation emitted from the ultraviolet lamp 39b, and hydroxyl radicals which are a strong oxidizer are generated in the water 36 by the cooperation of the ozone and the ultraviolet radiation. The hydroxyl radicals effectively oxidize dioxins and other non-biodegradable substances contained in the water 36 for removal thereof. The exhaust ozone gas discharged from the treatment vessel 38 is decomposed in an exhaust ozone gas decomposition tower 42, and then released to the atmosphere.

Sludge discharged from the pretreatment process 22, the biological treatment process 24 and the coagulation/sedimentation process 26 is slurried, and the resulting slurry 43 is subjected to an ultrasonic treatment process 44. The ultrasonic process 44 is the same as that described with reference to FIG. 1 and, therefore, no explanation will be given thereto.

The slurry 45 subjected to the ultrasonic treatment process 44 is introduced into a settling tank 46, and further subjected to a sedimentation process. The resulting supernatant liquor 46a is subjected to the coagulation/sedimentation process 26, the sand filtration process 28 and the photo-chemical treatment process 30, while the resulting sediment sludge 46b is introduced into a dewatering machine 47, in which the sediment sludge 46b is subjected to solid-liquid separation. The removed water 47a is subjected to the coagulation/sedimentation process 26, the sand filtration process 28 and the photo-chemical treatment process 30, and the dewatered sludge cake 47b is discharged as treated sludge.

In this manner, the solid phase free from dioxins is obtained as the dewatered cake, while the liquid phase containing decomposition products and pollutants is treated through the photo-chemical treatment process 30. Thus, the treatment of the sludge can be completed in this system.

If the concentration of the sediment sludge is low (i.e., not higher than 1% on a TS basis) when the sediment sludge is to be transferred from the settling tank 46 to the dewatering machine 47, the sediment sludge in the settling tank 46 is supplied as drawn sludge 46c into a sludge thickener 48 as indicated by broken lines in FIG. 3. The removed water 48a is subjected to the coagulation/sedimentation process 26, the sand filtration process 28 and the photo-chemical treatment process 30. On the other hand, the resulting thick sludge 48b is temporarily stored in a sludge storage tank 49, and then supplied as feed sludge 49a into the dewatering machine 47. Thus, the dewatering can stably be performed with an improved dewatering efficiency.

Figure 5:
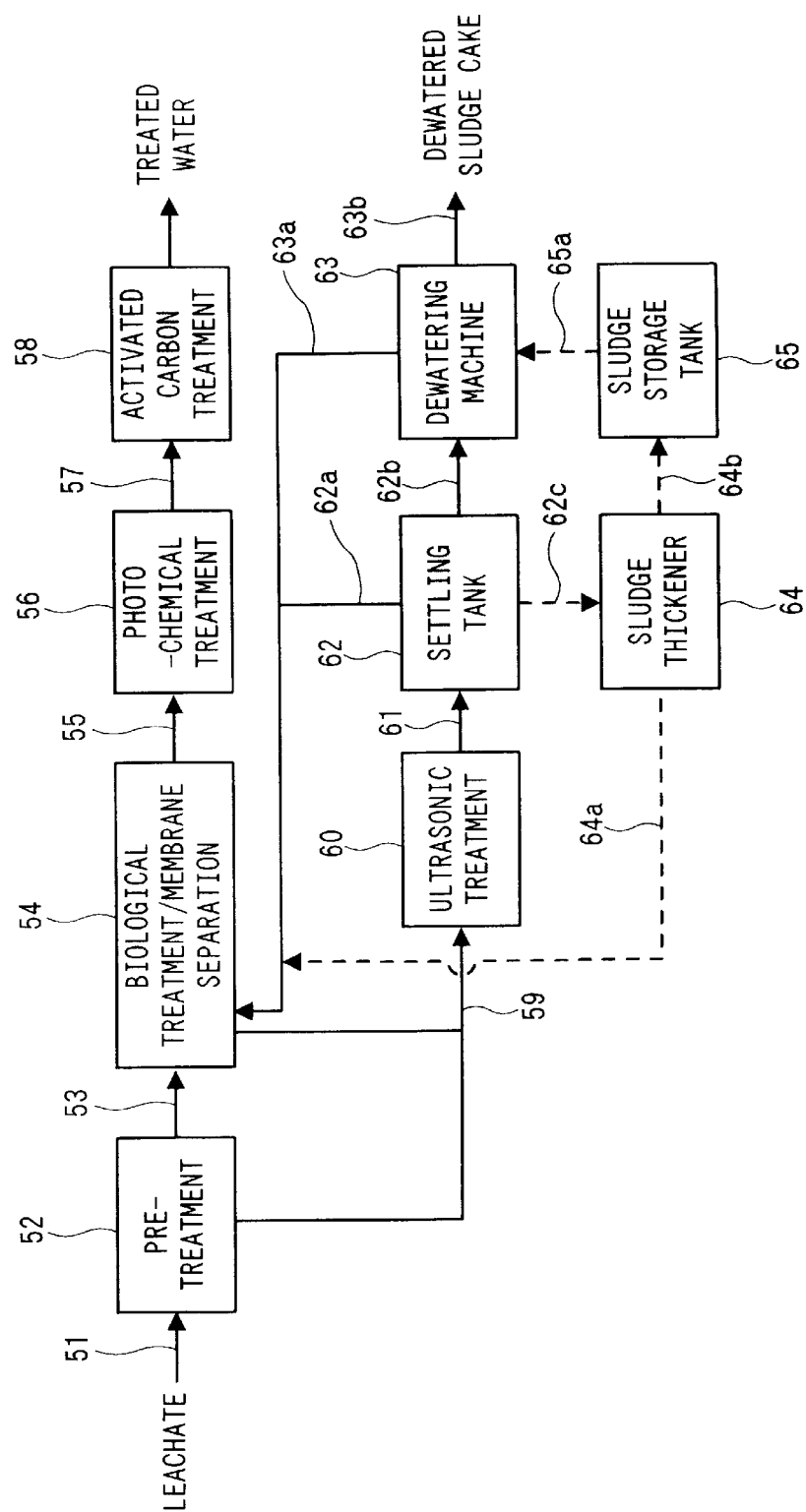
FIG. 5 is a flow sheet showing a process for removing dioxins through decomposition thereof in accordance with further another embodiment of the present invention.

Further another embodiment of the present invention will be described with reference to the drawings. Referring to FIG. 5, leachate 51 from a landfill in a general waste final disposal site is subjected to a pretreatment process 52 for coagulation and sedimentation of calcium contained in the leachate. The water 53 pretreated through the coagulation and sedimentation is then subjected to a biological treatment/membrane separation process 54, in which biodegradable substances contained in the pretreated water 53 are biodegraded for removal thereof and the biologically treated water is filtered by means of a membrane separation unit (employing a ceramic membrane, an ultrafiltration membrane, a microfiltration membrane or the like) immersed in a treatment vessel.

The membrane permeate 55 is subjected to a photo-chemical treatment process 56, in which non-biodegradable substances such as dioxins contained in the membrane permeate 55 are decomposed by applying ultraviolet radiation thereto in the presence of ozone. This process is the same as that described with reference to FIG. 4 and, therefore, no explanation will be given thereto. The photolytically treated water 57 is subjected to an activated carbon treatment process 58, in which pollutants remaining in the photolytically treated water 57 are adsorbed by activated carbon.

Sludge discharged from the pretreatment process 52 and the biological treatment/membrane separation process 54 is slurried, and the resulting slurry 59 is subjected to an ultrasonic treatment process 60. The ultrasonic treatment process 60 is the same as that described with reference to FIG. 1 and, therefore, no explanation will be given thereto. The slurry 61 treated through the ultrasonic treatment process 60 is introduced into a settling tank 62 for sedimentation. The resulting supernatant liquor 62a is further subjected to the biological treatment/membrane separation process 54 and the photo-chemical treatment process 56, while the resulting sediment sludge 62b is introduced into a dewatering machine 63 in which the sediment sludge 62b is subjected to solid-liquid separation. The removed water 63a is subjected to the photo-chemical treatment process 56, and the dewatered sludge cake 63b is discharged as treated sludge.

If the concentration of the sediment sludge is low (i.e., not higher than 1% on a TS basis) when the sediment sludge is to be transferred from the settling tank 62 to the dewatering machine 63, the sediment sludge in the settling tank 62 is supplied as drawn sludge 62c into a sludge thickener 64 as indicated by broken lines in FIG. 5. The removed water 64a is subjected to the biological treatment/membrane separation process 54 and the photo-chemical treatment process 56. On the other hand, the resulting thick sludge 64b is temporarily stored in a sludge storage tank 65, and then supplied as feed sludge 65a into the dewatering machine 63. Thus, the dewatering can stably be performed with an improved dewatering efficiency.

What is claimed is:

1. A process for decomposition and removal of dioxins contained in sludge, the process comprising the steps of:

slurrying sludge to be treated;

applying ultrasonic radiation to the slurry to decompose dioxins contained in the sludge in a reaction field developed by the application of the ultrasonic radiation and to transfer pollutants including the resulting decomposition products from a solid phase to a liquid phase of the slurry; and separating the slurry into the liquid phase containing the pollutants and the solid phase free from dioxins by solid-liquid separation means.

2. In a waste water treatment system which includes: a pretreatment process for coagulating and sedimenting calcium contained in waste water to be treated; a biological treatment process for biodegrading biodegradable substances contained in the pretreated water for removal thereof; a coagulation/sedimentation process for coagulating and sedimenting pollutants contained in the biologically treated water; a filtration process for filtering floating matters contained in the water treated through the coagulation/sedimentation process; a photo-chemical treatment process for decomposing non-biodegradable substances contained in the resulting filtrate by application of ultraviolet radiation in the presence of ozone; and an adsorption process for adsorbing pollutants remaining in the photolytically treated water, a process for decomposition and removal of dioxins contained in sludge, comprising the steps of:

slurrying sludge discharged from the pretreatment process, the biological treatment process and the coagulation/segmentation process, and introducing the resulting slurry into a reaction vessel;

applying ultrasonic radiation to the slurry by ultrasonic radiation means, whereby a reaction field is developed in the slurry by ultrasonic vibration and dioxins and other pollutants contained in the sludge are transferred from a solid phase to a liquid phase of the slurry for decomposition of dioxins contained in the sludge in the reaction field;

separating the resulting slurry into the liquid phase containing the pollutants and decomposition products and the solid phase free from dioxins by solid-liquid separation means; and introducing the separated liquid phase to the photo-chemical treatment process.

3. In a waste water treatment system which includes: a pretreatment process for coagulating and sedimenting calcium contained in waste water to be treated; a biological treatment/membrane separation process for biodegrading biodegradable substances contained in the pretreated water, and filtering the biologically treated water by membrane separation means; a photo-chemical treatment process for decomposing non-biodegradable substances contained in the resulting membrane permeate by application of ultraviolet radiation in the presence of ozone; and an adsorption process for adsorbing pollutants remaining in the photolytically treated water, a process for decomposition and removal of dioxins contained in sludge, comprising the steps of:

slurrying sludge discharged from the pretreatment process and the biological treatment/membrane separation process, and introducing the resulting slurry into a reaction vessel;

applying ultrasonic radiation to the slurry by ultrasonic radiation means, whereby a reaction field is developed in the slurry by ultrasonic vibration and dioxins and other pollutants contained in the sludge are transferred from a solid phase to a liquid phase of the slurry for decomposition of dioxins contained in the sludge in the reaction field;

separating the resulting slurry into the liquid phase containing the pollutants and decomposition products and the solid phase free from dioxins by solid-liquid separation means; and introducing the separated liquid phase to the photochemical treatment process.

* * * * *